US010116859B2

(12) United States Patent
Matsunaga (10) Patent No.: US 10,116,859 B2
(45) Date of Patent: Oct. 30, 2018

(54) IMAGE PROCESSING APPARATUS AND IMAGE PROCESSING METHOD THAT PRESENT ASSIST INFORMATION TO ASSIST PHOTOGRAPHING (71) Applicant: OLYMPUS CORPORATION, Hachioji-shi, Tokyo (JP)

(72) Inventor: Maki Matsunaga, Akiruno (JP)

(73) Assignee: OLYMPUS CORPORATION, Tokyo (JP)

(*) Notice: Subject to any disclaimer, the term of this patent is extended or adjusted under 35 U.S.C. 154(b) by 0 days.

(21) Appl. No.: 15/133,923

(22) Filed: Apr. 20, 2016

(65) Prior Publication Data

US 2016/0234432 A1 Aug. 11, 2016

Related U.S. Application Data (63) Continuation of application No. PCT/JP2014/076922, filed on Oct. 8, 2014.

(30) Foreign Application Priority Data

Oct. 28, 2013 (JP) ................................ 2013-223753

(51) Int. Cl.
*H04N 5/232* (2006.01)
*G03B 17/14* (2006.01)
*G03B 17/20* (2006.01)

(52) U.S. Cl.
CPC ..... *H04N 5/23222* (2013.01); *H04N 5/23293* (2013.01); *G03B 17/14* (2013.01); *G03B 17/20* (2013.01)

(58) Field of Classification Search
CPC ........... H04N 5/23222; H04N 5/23293; G03B 17/14; G03B 17/20
See application file for complete search history.

(56) References Cited

U.S. PATENT DOCUMENTS 8,228,413 B2* 7/2012 Ellenby .................. G03B 17/24
348/207.11
8,294,813 B2* 10/2012 Kawaguchi ............ H04N 5/232
348/371

(Continued)

FOREIGN PATENT DOCUMENTS

JP 2006352712 A 12/2006
JP 2009521134 A 5/2009

(Continued)

OTHER PUBLICATIONS

International Preliminary Report on Patentability (IPRP) including Written Opinion (in English) dated May 12, 2016, issued in International Application No. PCT/JP2014/076922.

(Continued)

*Primary Examiner* — Luong T Nguyen
(74) *Attorney, Agent, or Firm* — Holtz, Holtz & Volek PC (57) ABSTRACT An image processing apparatus includes a photographic information acquisition unit, a scene/subject discrimination unit, an assist information retrieval unit, and a display unit. The photographic information acquisition unit acquires photographic information. The scene/subject discrimination unit discriminates a photographic scene or a subject based on the photographic information. The assist information retrieval unit retrieves assist information concerning a lens corresponding to a discrimination result of the photographic scene or the subject. The display unit displays the retrieved assist information. The assist information includes lens-related assist information which includes a sample image showing an example corresponding to a lens, a type of a lens, a specification of the lens, and a setting of the lens.

7 Claims, 9 Drawing Sheets (56) References Cited

U.S. PATENT DOCUMENTS

| | | | |
|---|---|---|---|
| 8,538,074 B2 * | 9/2013 | Nakamura | G06T 11/60 |
| | | | 382/103 |
| 9,736,424 B2 * | 8/2017 | Komiyama | H04N 5/772 |
| 2007/0147826 A1 | 6/2007 | Matsuzaki et al. | |
| 2011/0273607 A1 | 11/2011 | Nonaka et al. | |
| 2013/0242134 A1 | 9/2013 | Komiyama | |

FOREIGN PATENT DOCUMENTS

| | | | |
|---|---|---|---|
| JP | 2010181725 A | | 8/2010 |
| JP | 2010268031 A | | 11/2010 |
| JP | 2011170194 A | | 9/2011 |
| JP | 2013128251 A | | 6/2013 |
| JP | 2013-197739 | * | 9/2013 |
| JP | 2013197739 A | | 9/2013 |

OTHER PUBLICATIONS

International Search Report (ISR) dated Jan. 6, 2015 issued in International Application No. PCT/JP2014/076922.
Japanese Office Action dated Dec. 12, 2017 issued in counterpart Japanese Application No. 2013-223753.

* cited by examiner

IMAGE PROCESSING APPARATUS AND IMAGE PROCESSING METHOD THAT PRESENT ASSIST INFORMATION TO ASSIST PHOTOGRAPHING

CROSS-REFERENCE TO RELATED APPLICATIONS

This application is a Continuation Application of PCT Application No. PCT/JP2014/076922, filed Oct. 8, 2014 and based upon and claiming the benefit of priority from the prior Japanese Patent Application No. 2013-223753, filed Oct. 28, 2013, the entire contents of both of which are incorporated herein by reference.

BACKGROUND OF THE INVENTION

1. Field of the Invention

The present invention relates to an image processing apparatus and an image processing method that present assist information to assist photographing.

2. Description of the Related Art

Various suggestions have been made in relation to an apparatus which presents a variety of assist information concerning photographing to a user. For example, a system suggested in Jpn. PCT National Publication No. 2009-521134 retrieves from a database an image having an image feature amount similar to an image feature amount extracted from an image obtained by photographing, and presents to a user information indicating in which direction an imaging apparatus should be moved to approximate to the same composition as a composition of the retrieved image as assist information.

BRIEF SUMMARY OF THE INVENTION

According to a first aspect of the invention, there is provided an image processing apparatus comprising: an image acquisition unit which acquires image data; a photographic information acquisition unit which acquires photographic information concerning the image data; a scene/subject discrimination unit which discriminates a photographic scene or a subject in the image data based on the photographic information; an assist information retrieval unit which retrieves assist information concerning a lens corresponding to a discrimination result of the photographic scene or the subject; and a display unit which displays the retrieved assist information, wherein the assist information comprises lens-related assist information which includes at least one of a sample image showing an example corresponding to a lens, a type of a lens when the sample image is acquired, a specification of the lens when the sample image is acquired, and a setting of the lens when the sample image is acquired.

According to a second aspect of the invention, there is provided an image processing method comprising: acquiring image data; acquiring photographic information concerning the image data; discriminating a photographic scene or a subject in the image data based on the photographic information; retrieving assist information concerning a lens corresponding to a discrimination result of the photographic scene or the subject; and displaying the retrieved assist information in a display unit, wherein the assist information comprises lens-related assist information which includes at least one of a sample image showing an example corresponding to a lens, a type of a lens when the sample image is acquired, a specification of the lens when the sample image is acquired, and a setting of the lens when the sample image is acquired.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute apart of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the drawings.

[First Embodiment]

Figure 1:
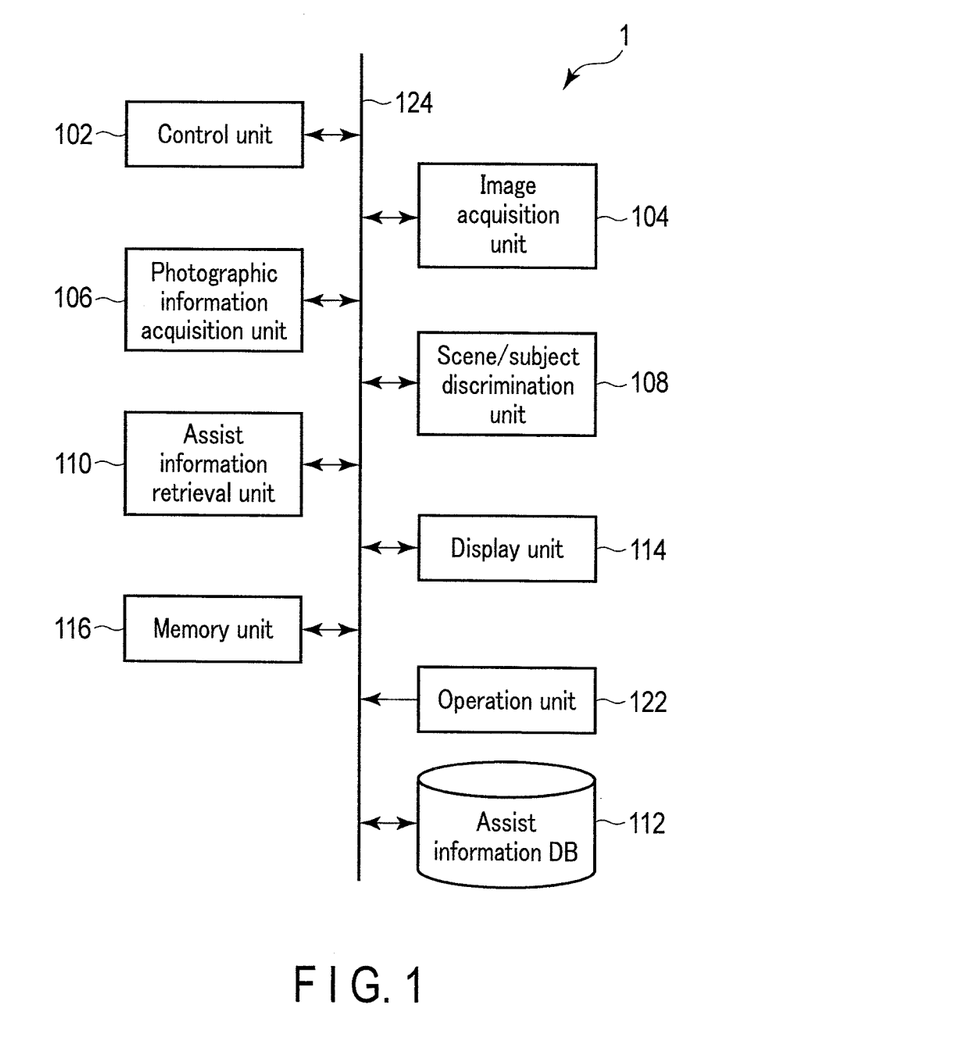
FIG. 1 is a block diagram showing an entire configuration of an imaging apparatus according to a first embodiment of the present invention.

A first embodiment according to the present invention will be first described. FIG. 1 is a block diagram showing an overall configuration of an imaging apparatus as an application example of an image processing apparatus according to the first embodiment of the present invention. An imaging apparatus 1 shown in FIG. 1 can be applied to various kinds of mobile terminal devices such as a digital camera, a cameral mobile phone, or a smartphone. This imaging apparatus 1 includes a control unit 102, an image acquisition unit 104, a photographic information acquisition unit 106, a photographic scene/subject discrimination unit 108, an assist information retrieval unit 110, an assist information database (DB) 112, a display unit 114, a memory unit 116, and an operation unit 122. Further, as shown in FIG. 1, the control unit 102, the image acquisition unit 104, the photographic information acquisition unit 106, the photographic scene/subject discrimination unit 108, the assist information retrieval unit 110, the assist information DB 112, the display unit 114, the memory unit 116, and the operation unit 122 are connected to each other through a bus 124 to enable mutual communication.

The control unit 102 has, e.g., a CPU, and controls overall operations of the imaging apparatus 1. For example, the control unit 102 controls an image acquiring operation performed by the image acquisition unit 104, or displays an image based on image data acquired by the image acquisition unit 104 on the display unit 114. Furthermore, the control unit 102 performs image processing to the image data acquired by the image acquisition unit 104 to create an image file, and stores the created image file in the memory unit 116.

The image acquisition unit 104 acquires image data. The image acquisition unit 104 is, e.g., an imaging unit including a lens, a diaphragm, a shutter, an imaging element, an A/D conversion circuit, and others. The lens in this embodiment is, e.g., an interchangeable lens configured to be detachable from a main body of the imaging apparatus 1. When the image acquisition unit 104 is an imaging unit, the image acquisition unit 104 converts an optical image of a subject that has entered through the lens into an analog electrical signal by the imaging element, and converts this analog electrical signal into a digital signal by the A/D conversion circuit to acquire image data.

The photographic information acquisition unit 106 acquires photographic information concerning the image data acquired by the image acquisition unit 104. The photographic information used herein includes a subject distance at the time of photographing, luminance of the image data, a color, an image feature amount, and a movement amount of the subject or the imaging apparatus 1. Moreover, as the image feature amount, for example, Local Binary Pattern (LBP), Scale-Invariant Feature Transform (SIFT), Speeded Up Robust Features (SURF), Oriented FAST and Rotated Brief (ORB), an HSV histogram, or the like is used.

The photographic scene/subject discrimination unit 108 discriminates a photographic scene and a main subject in the image data based on the photographic information acquired by the photographic information acquisition unit 106. The photographic scene/subject discrimination unit 108 discriminates a nightscape photographic scene when a luminance of a background region is low, discriminates a photographic scene of the sunset when the background region abundantly contains red color components, or discriminates a backlight photographic scene when the luminance of the background region is higher than that of the subject. Additionally, the photographic scene/subject discrimination unit 108 discriminates a macro photographic scene when a subject distance corresponds to a macro region which is set in accordance with each lens. Further, the photographic scene/subject discrimination unit 108 discriminates a main subject by comparing an image feature amount extracted as photographic information from the image data with, e.g., an image feature amount of each subject previously stored in the memory unit 116 in terms of similarity.

The assist information retrieval unit 110 retrieves assist information concerning a lens corresponding to a discrimination result of the photographic scene or the main subject in the photographic scene/subject discrimination unit 108 from the assist information DB 112. The assist information DB 112 stores the assist information concerning each lens in association with each type of photographic scene and each type of subject. The assist information is information including images (sample images) showing examples of various pictures and lens-related assist information used in photographing the respective sample images. Furthermore, the sample images in this embodiment include, e.g., sample images provided by photographing the same subject or the same photographic scene with the use of different lenses and sample images provided by photographing different subjects or different photographic scenes with the use of the same lens. Moreover, the lens-related assist information includes at least one of a name of each lens (which may be a model number or the like instead), a specification of each lens (a focal length, an open aperture value, or the like), and a setting concerning a lens at the time of photographing sample images (a setting of a focal length, a setting of an aperture value, or the like). Further, the lens-related assist information may include guide information or the like to explain to a user about various points to configure settings of the imaging apparatus 1 (shutter speed, an image processing setting, and others) and to acquire images equivalent to the sample images. Additionally, it is desirable for the assist information stored in the assist information DB 112 to be sequentially updated when, e.g., the imaging apparatus 1 is connected to a network.

The display unit 114 is a display unit such as a liquid crystal display or an organic EL display, and displays various kinds of images under control of the control unit 102. Further, the display unit 114 displays the assist information retrieved by the assist information retrieval unit 110.

The memory unit 116 includes, e.g., a ROM and a RAM, and stores the image data provided by photographing and the image feature amount of each subject used in discrimination of the subject performed by the photographic scene/subject discrimination unit 108. Here, it is desirable to sequentially update the image feature amount of each subject by machine learning using, e.g., Support Vector Machine (SVM) or the like. Further, the memory unit 116 stores various kinds of programs executed by the control unit 102 or various kinds of parameters used when the programs are executed. Furthermore, the memory unit 116 temporarily stores the image data acquired by the image acquisition unit 104 or various kinds of data such as image data which is being image-processed by the control unit 102.

The operation unit 122 is an operation unit to perform various kinds of operations of the imaging apparatus 1 by a user. The operation unit 122 may be a mechanical operation unit such as a button or an operation unit using a touch panel. An instruction to execute a photographing operation issued or various settings of a photographic scene mode and others are configured by an operation of the operation unit 122 performed by the user.

Figure 2:
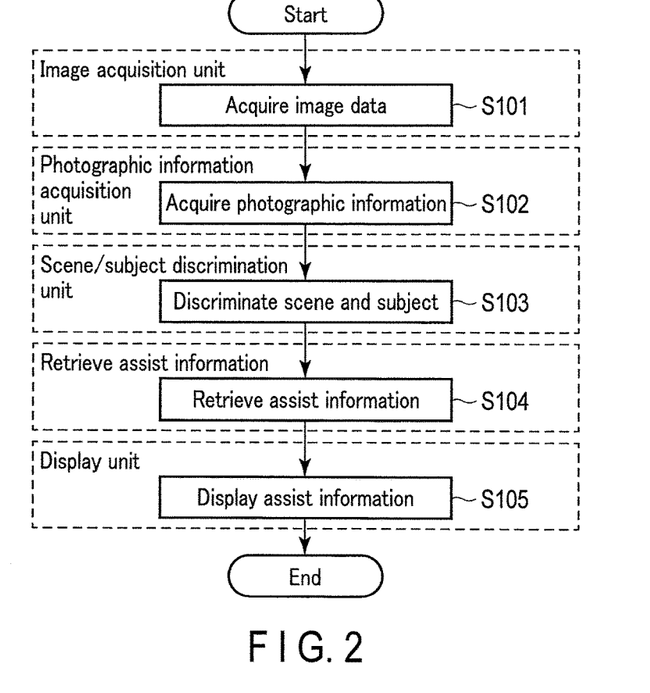
FIG. 2 is a flowchart showing a procedure of displaying assist information according to the first embodiment of the present invention.

An operation of the imaging apparatus 1 according to this embodiment will now be described. FIG. 2 is a flowchart showing a procedure of displaying the assist information as an image processing method according to this embodiment. Here, FIG. 2 shows a procedure at the time of displaying the assist information during display of a through image before photographing. Furthermore, the processing in the flowchart of FIG. 2 is mainly executed by the control unit 102.

In FIG. 2, the control unit 102 allows the image acquisition unit 104 to acquire image data (Step S101). Upon receiving an instruction from the control unit 102, the image acquisition unit 104 drives the imaging element to image a subject. An image signal provided by the imaging element is converted into a digital signal in the A/D conversion circuit. The image data as this digital signal is stored in the memory unit 116.

After acquiring the image data, the control unit 102 allows the photographic information acquisition unit 106 to acquire photographic information (Step S102). After acquiring the photographic information, the control unit 102 allows the photographic scene/subject discrimination unit.108 to discriminate a photographic scene and a main subject in the image data (Step 103).

After discriminating the photographic scene and the main subject, the control unit 102 allows the assist information retrieval unit 110 to retrieve assist information (Step S104). After retrieving the assist information, the control unit 102 allows the display unit 114 to display a through image based on the image data acquired at the Step S101, and also allows the display unit 114 to display the assist information retrieved at the Step S104 (Step S105). Then, the control unit 102 terminates the processing in FIG. 2.

Figure 3:
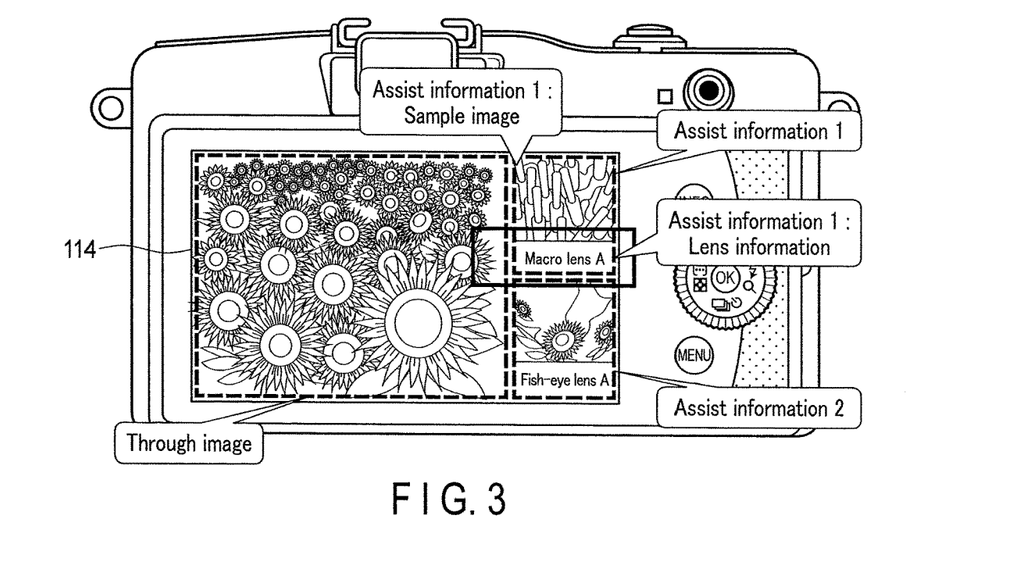
FIG. 3 is a view showing a display example of the assist information according to the first embodiment of the present invention.

FIG. 3 is a view showing a display example of the assist information according to the first embodiment of the present invention. Here, FIG. 3 shows a display example of the assist information when the photographic scene/subject discrimination unit 108 discriminates the main subject as "sunflowers (flowers)". When the main subject is discriminated as "sunflowers", sample images of sunflowers acquired with the use of different lenses are displayed in the display unit 114 together with lens-related assist information of the lenses used to acquire these sample images as shown in FIG. 3.

Here, in the example of FIG. 3, a sample image acquired with the use of a macro lens and a sample image acquired with the use of a fish-eye lens are shown. Such a combination of the sample images and the lenses is an example. Moreover, in FIG. 3, an example where the sample images are displayed on a right portion of the display unit 114 is shown. A display position of the sample images may be an upper portion, a lower portion, or a left portion of the display unit 114. Additionally, in FIG. 3, the example where the two sample images are displayed in the display unit 114 at a time is shown. On the other hand, three or more sample images may be displayed at a time. It is to be noted that, when many sample images cannot be displayed at a time, e.g., for the reason that an area of a display screen of the display unit 114 is limited, the sample images displayed in the display unit 114 may be changed by a scroll operation or the like performed by a user.

Figure 4:
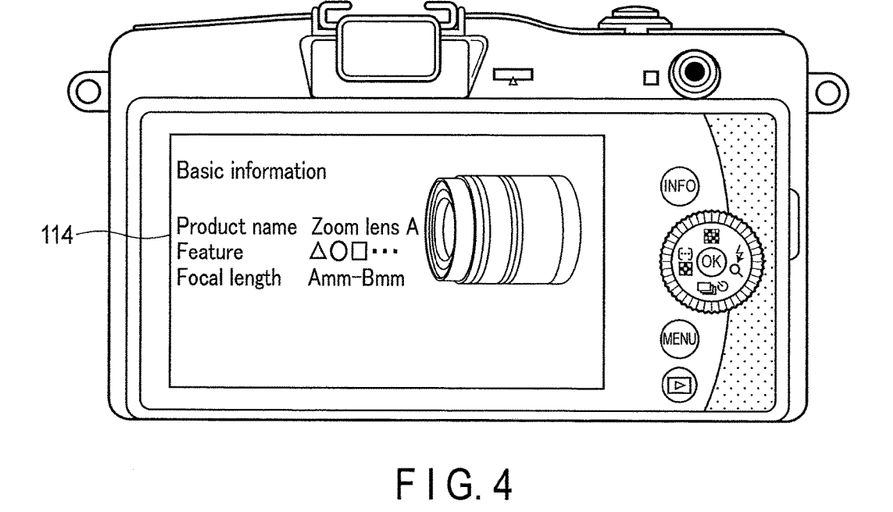
FIG. 4 is a view showing a first example of a screen displayed when the assist information is selected.

FIG. 4 is a view showing a first example of a screen which is displayed when any assist information in pieces of assist information displayed in the display unit 114 as shown in FIG. 3 is selected. In the first example, when the assist information is selected, detailed information of a lens associated with the selected assist information is displayed. For example, FIG. 4 shows an example where a product name of the lens, information indicating primary features, and information indicating specifications of the lens (a focal length in FIG. 4) are displayed as the detailed information of the lens. The detailed information of the lens that is displayed as the first example can be appropriately set. Types of information to be displayed may be set by a user.

Figure 5:
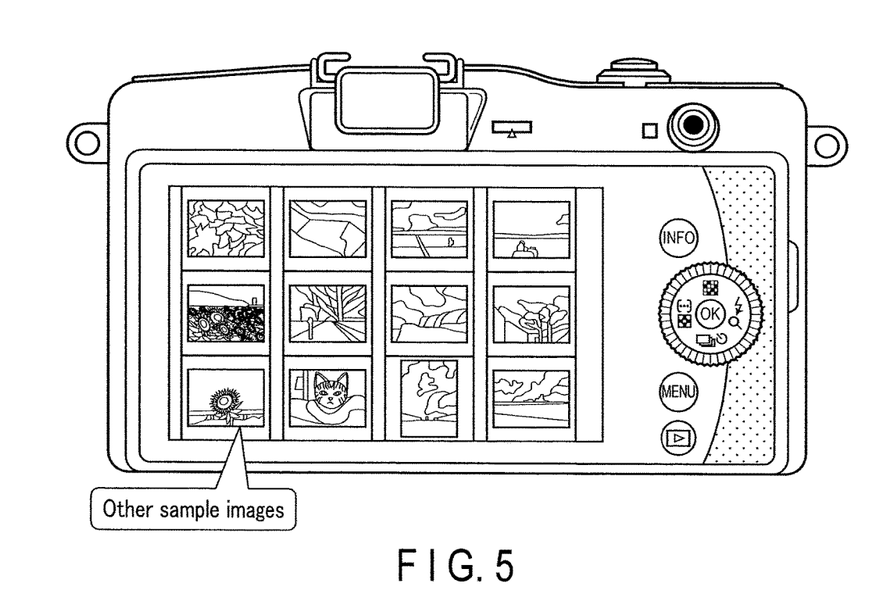
FIG. 5 is a view showing a second example of the screen displayed when the assist information is selected.

FIG. 5 is a view showing a second example of a screen displayed when any assist information in pieces of assist information displayed in the display unit 114 as shown in FIG. 3 is selected. In the second example, when the assist information is selected, assist information including other sample images acquired with the use of a lens associated with the selected assist information is displayed. The other sample images displayed as the second example may be images provided by photographing subjects different from a discrimination result provided by the photographic scene/subject discrimination unit 108.

Whether the screen is to be changed to the screen of FIG. 4 or changed to the screen of FIG. 5 when the assist information is selected during display of the screen of FIG. 3 is set by, e.g., an operation of the operation unit 122 performed by a user. Further, if the assist information is hierarchized, display of the screen of FIG. 3 is determined as a display screen of the assist information in a first hierarchy, and a change of a display screen can be controlled so that the display screen of FIG. 4 is displayed as a display screen of the assist information in a second hierarchy when any assist information is selected in the display screen of the assist information in the first hierarchy, and that the screen of FIG. 5 is displayed as a display screen of the assist information in a third hierarchy when any operation is performed in the display screen the assist information in the second hierarchy.

As described above, in this embodiment, the assist information concerning a lens corresponding to a situation of a photographic scene or a subject during display of a through image, i.e., corresponding to a photographic scene or a subject in which a user is considered to have an interest at the present moment is presented to the user. When such assist information concerning a lens is presented to the user, the user can be informed that a range of expression in photography can be expanded by lens exchange. For example, when the assist information including sample images provided by photographing the same subject or the same photographic scene with the use of different lenses is presented to the user, the user can be informed of a difference in expression caused due to a difference in lens. Furthermore, when the assist information including sample images provided by photographing different subjects or photographic scenes with the use of the same lens is presented to the user, the user can have an interest in photographing other subjects or photographic scenes by using the same lens.

Here, FIG. 2 shows an example where the assist information is displayed at the time of displaying a through image. On the other hand, the assist information may be displayed at the time of confirming a photography result after execution of photography or during reproduction of an image. When the assist information is displayed at the time of confirming a photography result or during reproduction of an image, an effect of urging the user to replace lenses when he/she possesses lenses or to purchase lenses when he/she does not possess them can be expected in the next and succeeding photography. It is to be noted that, in a case of executing processing in the flowchart of FIG. 2 during reproduction of an image, processing of Step S101 is processing of simply inputting image data alone. Furthermore, processing of Step S102 is changed to processing of acquiring photographic information when the image which is being reproduced is actually acquired. As the photographic information acquired in this case, that recorded in a header or the like in an image file is used. Moreover, in processing of Step S103, since an image which has been once discriminated is recorded in the header or the like of the image file, the image is read out.

Additionally, the assist information displayed in the display unit 114 may be acquired through a network. With such a configuration, since a capacity of the assist information DB 112 can be saved or information of a new lens is displayed when a manufacturer brings out the latest lens, the user can acquire the latest information.

[Second Embodiment]

Figure 6:
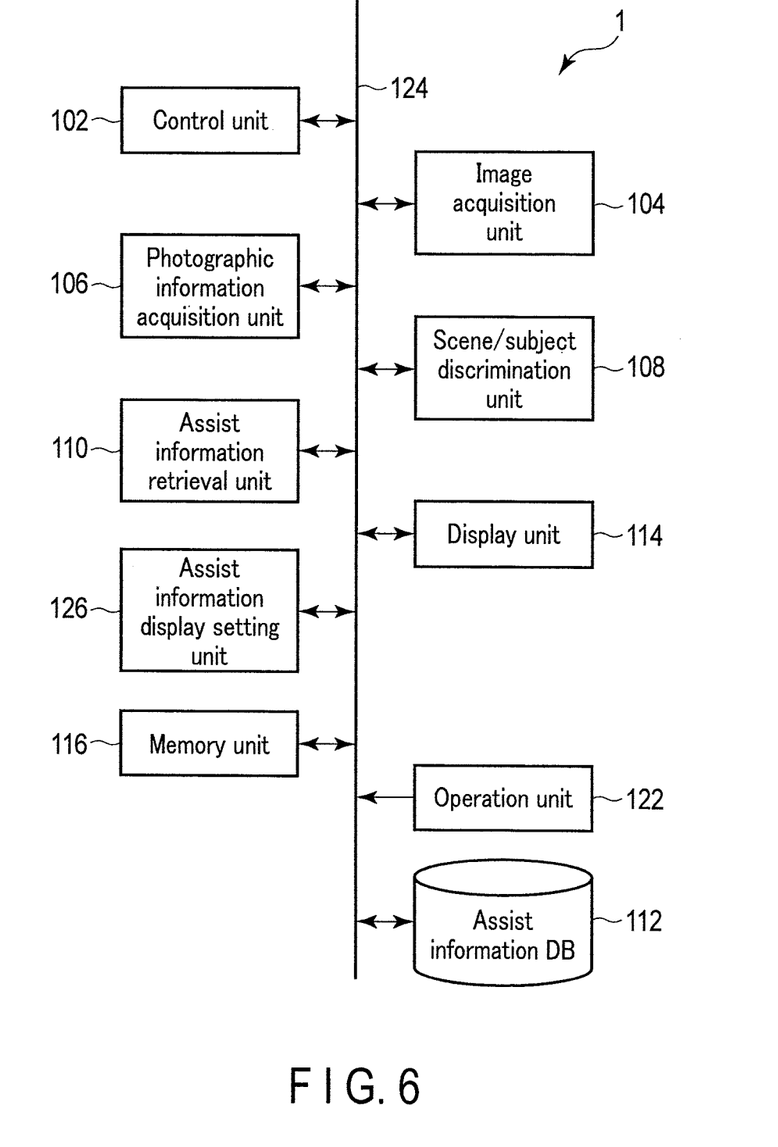
FIG. 6 is a block diagram showing an overall configuration of an imaging apparatus according to a second embodiment of the present invention.

A second embodiment according to the present invention will now be described. FIG. 6 is a block diagram showing an overall configuration of an imaging apparatus as an application example of an image processing apparatus according to a second embodiment of the present invention. In FIG.6, a description on the same blocks as those in FIG. 1 will be omitted. An imaging apparatus 1 in the second embodiment further includes an assist information display setting unit 126.

The assist information display setting unit 126 accepts, e.g., an operation of an operation unit 122 performed by a user, and sets conditions for display of assist information. The conditions are, e.g., conditions of whether the assist information is to be displayed and conditions of timing to display the assist information. The timing to display the assist information is, e.g., when a shutter button which is an operation unit to instruct execution of photographing is half-depressed, when a photography result is confirmed in a case where the shutter button is fully depressed, or when an image is viewed in a case where a reproduction button is pressed.

Figure 7:
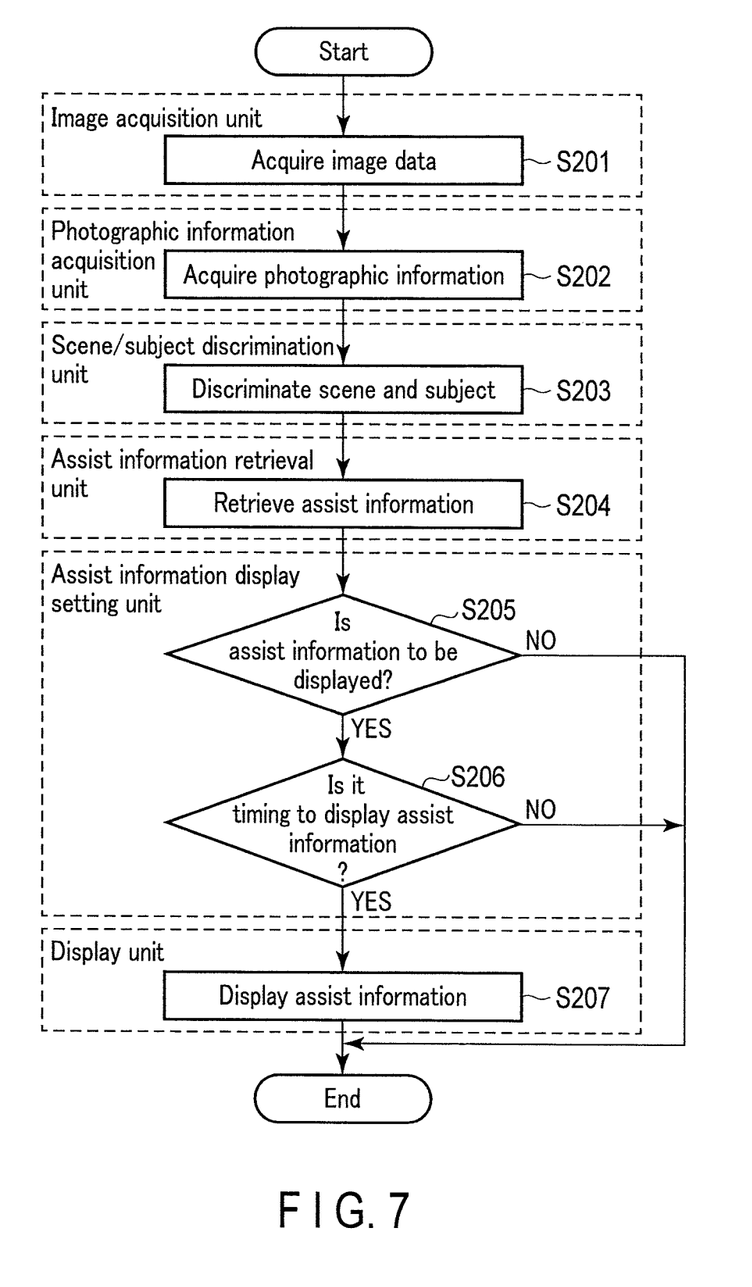
FIG. 7 is a flowchart showing a procedure of displaying assist information according to the second embodiment of the present invention.

An operation of the imaging apparatus 1 according to this embodiment will now be described. FIG. 7 is a flowchart showing a procedure of displaying the assist information as an image processing method according to this embodiment. Here, in FIG. 7, a description of processing which is the same as that in FIG. 2 will be omitted. That is, processing of Step S201 to S204 is the same as that of the Step S101 to S104, and hence a description thereof will be omitted.

After retrieving the assist information by an assist information retrieval unit 110, a control unit 102 determines whether the assist information display setting unit 126 is set so that the assist information is displayed (Step S205). When the assist information display setting unit 126 is determined not to be set so that the assist information is displayed at the Step S205, the control unit 102 terminates the processing of FIG. 7. In this case, the assist information is not displayed. It is to be noted that processing of display of a through image or the like is continued irrespective of presence/absence of display of the assist information.

When the assist information display setting unit 126 is determined to be set so that the assist information is displayed at the Step S205, the control unit 102 determines whether the present moment is the timing to display the assist information which is set in the assist information display setting unit 126 (Step S206). When the current moment is determined not to be the timing to display the present information set in the assist information display setting unit 126, the control unit 102 terminates the processing of FIG. 7. In this case, the assist information is not displayed. That is, even if the assist information is set to be displayed, the assist information is not displayed when the current moment is not the timing to display the assist information. It is to be noted that, like the Step S205, the processing of display of a through image or the like is continued regardless of presence/absence of display of the assist information.

When the present moment is determined to be the timing to display the assist information at the Step S206, the control unit 102 displays an image corresponding to image data acquired at the Step S201 in a display unit 114 as a through image, and also displays the assist information retrieved at the Step S204 in the display unit 114 (Step S207). Then, the control unit 102 terminates the processing of FIG. 7.

As described above, in this embodiment, the user can arbitrarily set whether the assist information is to be displayed and at which timing display is performed in the case of displaying this information. Consequently, usability for the user can be improved.

[Third Embodiment]

Figure 8:
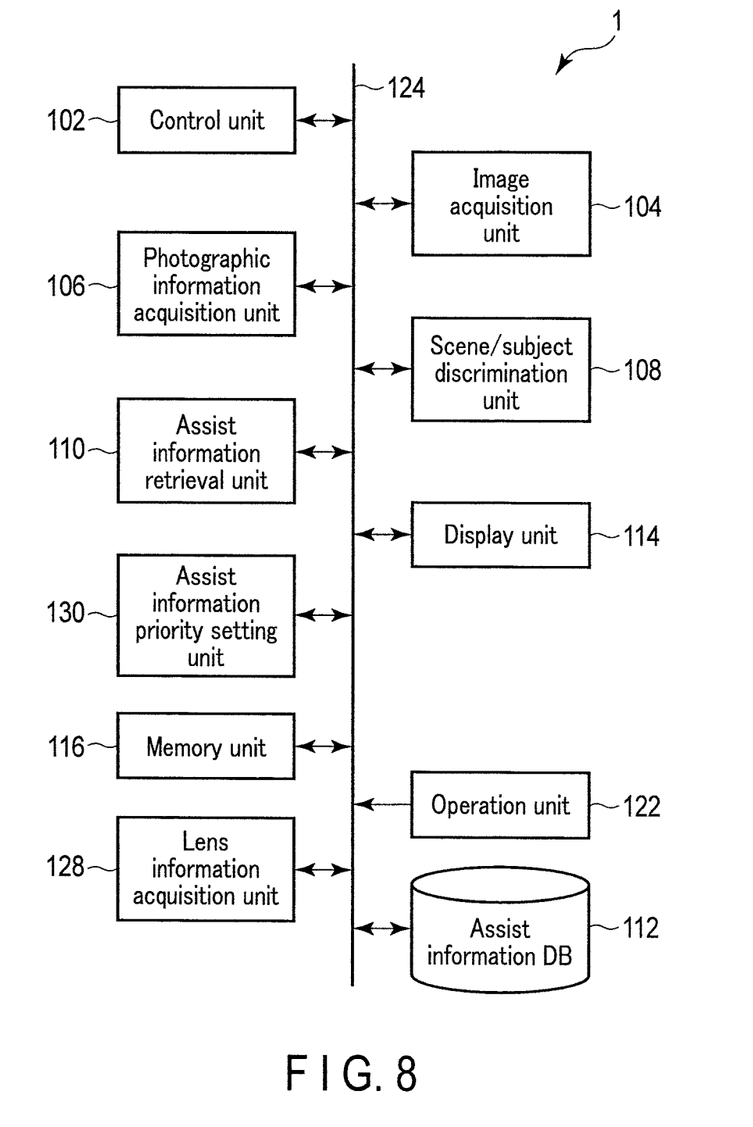
FIG. 8 is a block diagram showing an overall configuration of an imaging apparatus according to a third embodiment of the present invention.

A third embodiment according to the present invention will now be described. FIG. 8 is a block diagram showing an overall configuration of an imaging apparatus as an application example of an image processing apparatus according to a third embodiment of the present invention. In FIG. 8, a description on the same blocks as those in FIG. 1 will be omitted. An imaging apparatus 1 in the third embodiment further includes a lens information acquisition unit 128 and an assist information priority setting unit 130.

The lens information acquisition unit 128 acquires lens information. The lens information is information which is used to set a priority of assist information, and is also information indicating a relationship between a corresponding lens and a user. This lens information includes information indicating whether a user possesses a corresponding lens. Further, when the user possesses the corresponding lens, the lens information further includes information indicative of a purchasing time of the corresponding lens. Furthermore, when the user possesses the corresponding lens and this lens has been mounted in the imaging apparatus 1, the lens information further includes information indicative of a time when the corresponding lens has been mounted for the first time and information indicative of the number of images acquired by using the corresponding lens. The information indicative of the time when the corresponding lens has been mounted is acquired by communication between the imaging apparatus 1 and the lens at the time of mounting the lens to the imaging apparatus 1, and stored in a memory unit 116. On the other hand, as to the information indicating whether the user possesses the corresponding lens and the information indicating whether the user has mounted the corresponding lens in the imaging apparatus 1, information indicating that the user does not possess the corresponding lens and information indicating that the user has not mounted the corresponding lens in the imaging apparatus 1 is stored in the memory unit 116 in an initial state. Moreover, when the user has purchased the corresponding lens, the information indicating that the user does not possess the corresponding lens is updated to the information indicating that the user possesses the corresponding lens. At this time, the information indicative of the purchasing time of the lens is also stored in the memory unit 116. Additionally, when communication between the lens and the imaging apparatus 1 is established, updating to the information indicating that the user has mounted the corresponding lens in the imaging apparatus is performed. At this time, the information indicative of the time of mounting the corresponding lens for the first time is also stored in the memory unit 116. Further, when photographing is performed while the corresponding lens is mounted, information indicative of the number of photographed pictures is updated.

The assist information priority setting unit 130 sets the priority of pieces of assist information recorded in an assist information DB 112 by using the lens information acquired by the lens information acquisition unit 128. For example, the assist information priority setting unit 130 sets the priority so that the assist information of the lens currently mounted in the imaging apparatus 1 is displayed on a priority basis.

Figure 9:
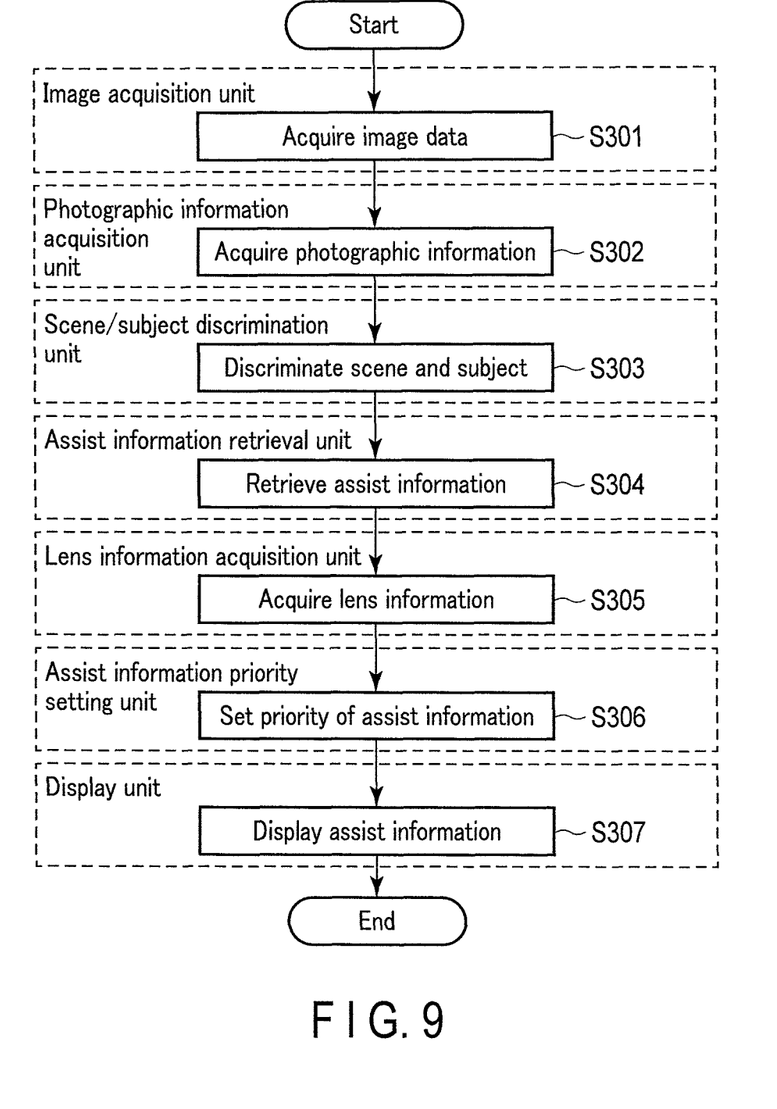
FIG. 9 is a flowchart showing a procedure of displaying assist information according to the third embodiment of the present invention.

An operation of the imaging apparatus 1 according to this embodiment will now be described. FIG. 9 is a flowchart showing a procedure of displaying the assist information as an image processing method according to this embodiment. Here, in FIG. 9, the same processing as that in FIG. 2 will be omitted. That is, processing of Step S301 to S304 is the same as the processing of the Step S101 to S104, and hence a description thereof will be omitted.

After retrieving the assist information by the assist information retrieval unit 110, the control unit 102 acquires the lens information by using the lens information acquisition unit 128 (Step S305). After acquiring the lens information, the control unit 102 allows the assist information priority setting unit 130 to set the priority of the assist information (Step S306). Here, as priority setting conditions, there can be considered various setting conditions; for example, increasing the priority of the assist information of a lens which is currently mounted in the imaging apparatus 1, increasing the priority of the assist information of a lens whose purchasing time is recent, increasing the priority of the assist information of a lens with which a larger number of images have been acquired, increasing the priority of the assist information of a lens which has not been mounted, increasing the priority of the assist information of a lens possessed by the user, increasing the priority of the assist information of a lens which is not possessed by the user, equalizing the priority of the respective pieces of assist information, and others. For example, the user determines which one of the setting conditions is used to set the priority.

After setting the priority, the control unit 102 displays an image corresponding to image data acquired at the Step S301 as a through image in a display unit 114, and also displays the assist information retrieved at the Step S304 in the display unit 114 in accordance with the priority set by the assist information priority setting unit 130 (Step S307). Then, the control unit 102 terminates the processing of FIG. 9.

Figure 10:
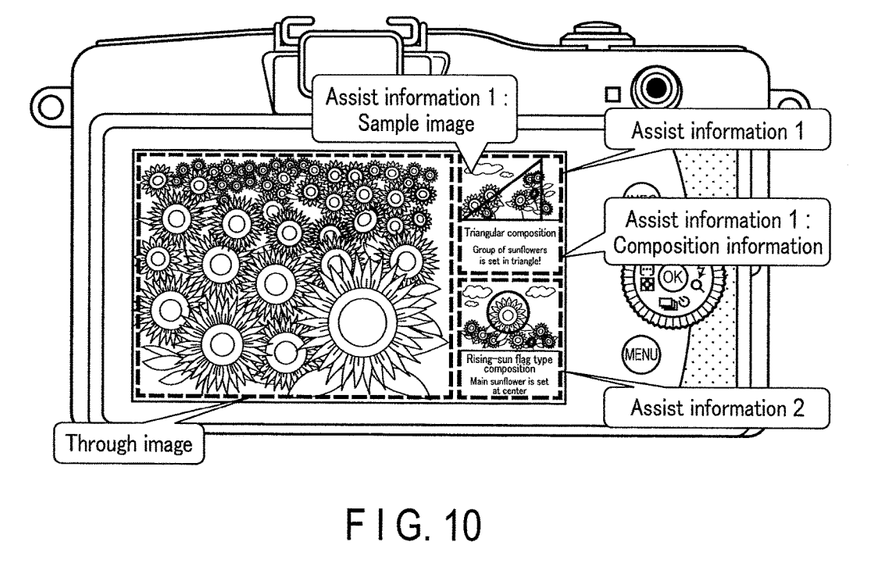
FIG. 10 is a view showing a first display example of the assist information according to the third embodiment of the present invention.

FIG. 10 is a view showing a first display example of the assist information according to the third embodiment of the present invention. The first display example is a display example when the priority setting conditions are set so that the priority of lens information of a currently mounted lens is increased. In this case, in assist information relating to "sunflowers" retrieved at the Step S304, assist information of the currently mounted lens is displayed in the display unit 114 on a priority basis. In a case of displaying the assist information of the currently mounted lens in the display unit 114 on the priority basis, the user can see assist information of a lens which is most appropriate to a current photographing situation. For example, the user can see, e.g., information of a distance between a camera and a subject, composition information of an angle and others, or assist information of a color, brightness, an aperture value, and others that can be set on the camera side as a method which enables photographing while exploiting the mounted lens to the maximum extent.

Figure 11:
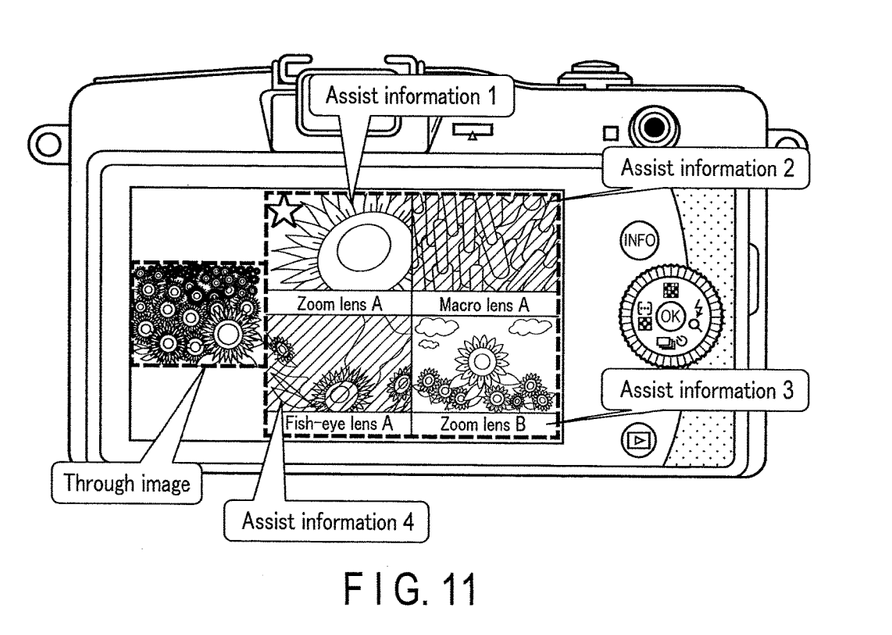
FIG. 11 is a view showing a second display example of the assist information according to the third embodiment of the present invention.

FIG. 11 is a view showing a second display example of the assist information according to the third embodiment of the present invention. The second display example is a display example when the priority setting conditions are set to equalize the priority of the respective pieces of assist information. In this case, in the assist information relating to the "sunflowers" retrieved at the Step S304, assist information of a lens currently mounted in the imaging apparatus 1, assist information of a lens which has been mounted in the imaging apparatus 1, assist information of a lens which has not been mounted in the imaging apparatus 1, and assist information of a lens which is not possessed by the user are displayed in the display unit 114, respectively.

Here, in a case of display of FIG. 11, it is desirable to enable the user to recognize each of the pieces of assist information displayed in the display unit 114 as assist information displayed based on each piece of lens information. Thus, a sample image acquired by a lens which is not possessed by the user is displayed after being converted into a grayscale or by superimposing a gray image on the background of a color image. In FIG. 11, a sample image of assist information 2 and a sample image of assist information 4 are sample images acquired by lenses which are not possessed by the user. For example, a star sign is given to a sample image acquired by a lens which has been recently purchased by the user. In FIG. 11, a sample image of assist information 1 is a sample image acquired by a lens which has been recently purchased by the user. Alternatively, the star sign may be given to a recommended lens which is recommended for a scene or a subject based on a recognition result of the scene or the subject. With such display, the user can recognize at a glance whether he/she possesses the lens when he/she sees a thumbnail of sample images. Thus, replacement of the lens is urged when the lens is not mounted even though the user possesses it, and purchase of the lens is urged when the lens is not possessed.

As described above, in this embodiment, setting the priority of the assist information according to the lens information enables to appropriately present information desired by the user. Further, replacement of the lens or the purchase of the lens can be urged by presenting not only the assist information of the currently mounted lens but also the assist information of the lens which is not mounted but possessed and the assist information of the lens which is not possessed.

Here, the assist information display setting unit 126 described in the second embodiment may be provided in the imaging apparatus 1 in the third embodiment so that the assist information corresponding to the lens information described in the third embodiment can be displayed at a timing desired by the user.

[Fourth Embodiment]

Figure 12:
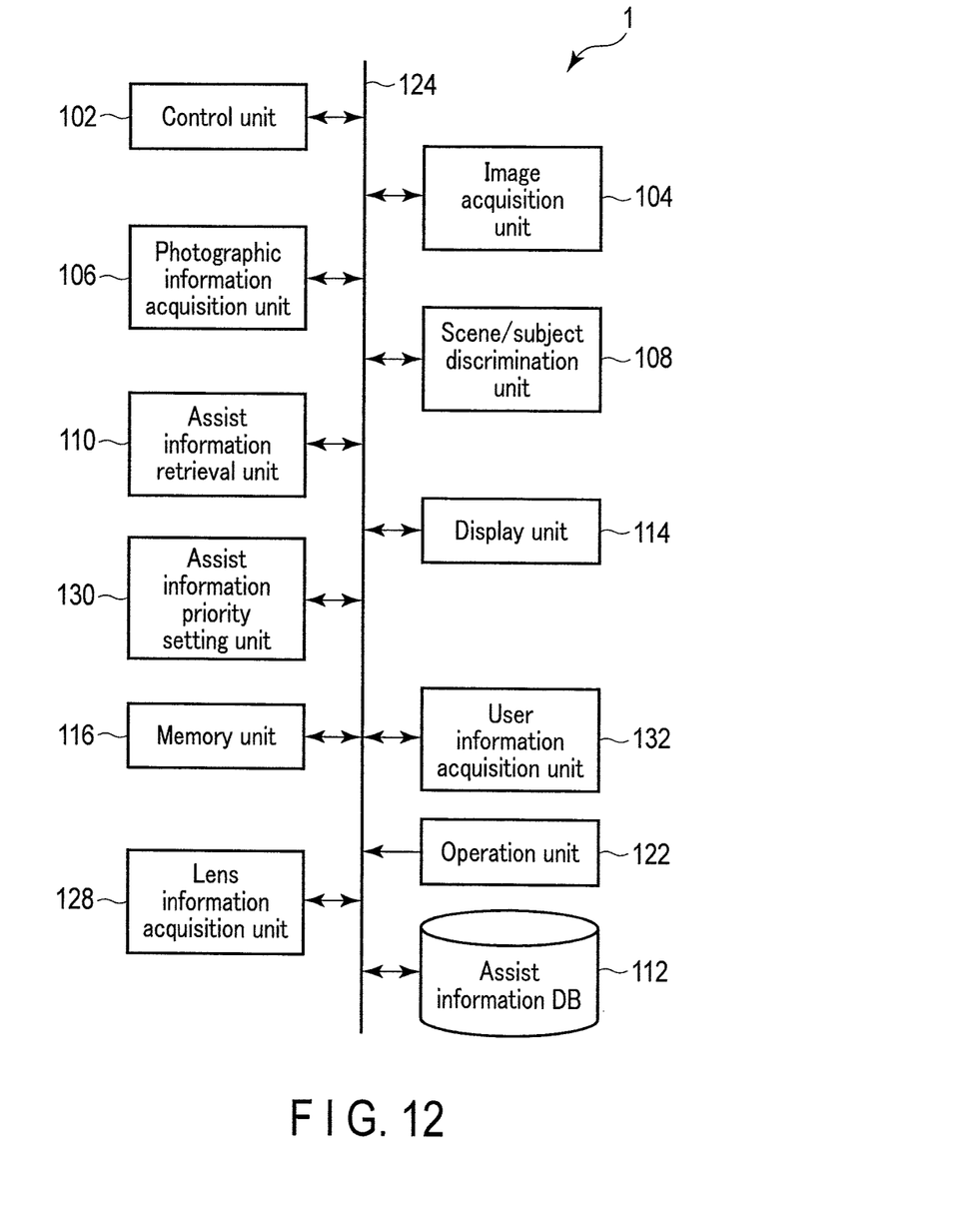
FIG. 12 is a block diagram showing an overall configuration of an imaging apparatus according to a fourth embodiment of the present invention.

A fourth embodiment according to the present invention will now be described. FIG. 12 is a block diagram showing an overall configuration of an imaging apparatus as an application example of an image processing apparatus according to a fourth embodiment of the present invention. In FIG. 12, a description of the same blocks as those in FIG. 8 will be omitted hereinafter. An imaging apparatus 1 in the fourth embodiment further includes a user information acquisition unit 132.

The user information acquisition unit 132 acquires user information. The user information is various kinds of information to identify a person using the imaging apparatus 1 at the present moment, and includes, e.g., information indicative of attributes of a user (a gender, a resident area, and others), information indicative of preferences of the user (a degree of interest in each sample image, a history of selection of assist information, a subject or a photographic scene which is often photographed, and others), and information indicative of a photographing skill (the number of pictures taken by using each lens and a photographing period). To authenticate a user, fingerprint authentication or face authentication can be used, and the user information acquisition unit 132 acquires information corresponding to a result of this authentication. Moreover, the user him/herself may input user information.

A procedure of displaying assist information in the fourth embodiment is the same as that in FIG. 9. However, at the time of the priority setting of the Step S306, the assist information priority setting unit 130 sets the priority while taking not only the lens information but also the user information into account. For example, it is known that Japanese females (especially females in their 20s to 30s) tend to prefer soft examples with blurs. Thus, when the user is a Japanese female, the assist information priority setting unit 130 increases the priority of a bright lens which is not very long so that it can be easily carried and enables taking pictures with blurs and assist information including sample images which are acquired by this lens and have a soft atmosphere. Further, it is known that Western males (especially in their 30s) tend to prefer brightly-colored sharp samples. Thus, when the user is a Western male, the assist information priority setting unit 130 increases the priority of information of a high-resolution lens and assist information including sample images which are taken by this lens and have high sharpness (e.g., sample images acquired by a lens with a high lens MTF).

Additionally, the assist information priority setting unit 130 changes the priority of assist information based on a history of viewing information of lenses by a user in online shopping or the like, a history of selection of presented examples, a history of pictures viewed by a user in a picture sharing site, and a preference information of photographic scenes, subjects, or the like which are often photographed. Further, the assist information priority setting unit 130 changes the priority of assist information based on information indicating how often the user takes pictures with the use of each lens, a length of a photographing period, and a degree of photographing skill.

As described above, in this embodiment, setting the priority of the assist information according to the user in addition to the lens information enables further appropriately presenting information desired by the user.

Here, the assist information display setting unit 126 described in the second embodiment may be provided to the imaging apparatus 1 in the fourth embodiment so that the assist information described in the fourth embodiment can be displayed at a timing desired by the user. Furthermore, in the fourth embodiment, the priority may be set from the user information only.

Although the present invention has been described based on the foregoing embodiments, the present invention is not restricted to the foregoing embodiments, and it is needless to say that various modifications or applications can be carried out within the gist of the present invention. Furthermore, in the description of the flowcharts of the respective operations, the operations are described by using words "further", "then", and others, but it does not mean that the operations must be performed in this order.

Moreover, the processing according to the foregoing embodiments can be stored as a program which can be executed by the control unit 102. Further, the processing can also be distributed if it is stored in a storage medium of an external memory device such as a memory card (an ROM card, an RAM card, and others), a magnetic disk (a hard disk and others), an optical disk (a CD-ROM, a DVD, and others), or a semiconductor memory. Additionally, the control unit 102 can read a program stored in the storage medium of this external memory device, and the operations are controlled by this read program, thereby executing the processing.

Further, the foregoing embodiments include inventions on various stages, and a variety of inventions can be extracted from appropriate combinations of the disclosed constituent requirements. For example, even if some of the constituent requirements are eliminated from all the constituent requirements described in embodiments, the above-described problems, can be solved, and a configuration provided by eliminating the constituent requirements can be also extracted as an invention as long as the above-described effect can be obtained.

What is claimed is:

1. An image processing apparatus comprising:
   a display;
   a memory; and
   a hardware processor which, under control of a program stored in the memory, controls execution of processes comprising:
   an image acquisition process which acquires image data;
   a photographic information acquisition process which acquires photographic information concerning the image data;
   a scene/subject discrimination process which discriminates a photographic scene or a subject in the image data based on the photographic information;
   an assist information retrieval process which retrieves assist information concerning a lens in accordance with a discrimination result of the photographic scene or the subject;
   a lens information acquisition process which acquires lens information which is information indicating a relationship between a corresponding lens and a user;
   an assist information priority setting process which sets a priority of pieces of assist information to be displayed on the display in accordance with the acquired lens information; and
   a display process which displays the retrieved assist information on the display,
   wherein the assist information comprises lens-related assist information which includes at least one of a sample image showing an example corresponding to the lens, a type of the lens used to acquire the sample image, a specification of the lens used to acquire the sample image, and a setting of the lens used to acquire the sample image,
   wherein the lens information includes at least one of information indicating whether the corresponding lens is mounted in an imaging apparatus which acquires the image data, information indicating that the corresponding lens has been mounted in the imaging apparatus which acquires the image data, and information indicating whether the user possesses the corresponding lens, and
   wherein the lens information further includes information indicative of a time of purchasing the corresponding lens, information indicative of a time of mounting the corresponding lens in the imaging apparatus for a first time, and information indicative of a number of pieces of image data acquired by using the corresponding lens.

2. The image processing apparatus according to claim 1, wherein the photographic information includes at least one of a subject distance, a brightness distribution of the image data, a color distribution of the image data, an image feature amount of the image data, a movement amount of the subject in the image data, and an imaging apparatus which acquires the image data.

3. The image processing apparatus according to claim 1, further comprising an input device operable by the user,
wherein the hardware processor further controls execution of an assist information display setting process which sets, based on an operation performed by the user via the input device, conditions for displaying the assist information on the display.

4. The image processing apparatus according to claim 3, wherein the conditions for displaying the assist information include a condition of whether or not the assist information is to be displayed and a condition of a timing at which to display the assist information.

5. The image processing apparatus according to claim 1, wherein the hardware processor further controls execution of a user information acquisition process which acquires user information of the user, and
wherein the assist information priority setting process sets the priority of the pieces of assist information to be displayed on the display in further accordance with the acquired user information.

6. The image processing apparatus according to claim 5, wherein the user information includes at least one of information indicative of attributes of the user, information indicative of preferences of the user, and information indicative of a photographing skill of the user.

7. An image processing method comprising:
acquiring image data;
acquiring photographic information concerning the image data;
discriminating a photographic scene or a subject in the image data based on the photographic information;
retrieving assist information concerning a lens in accordance with a discrimination result of the photographic scene or the subject;
acquiring lens information which is information indicating a relationship between a corresponding lens and a user;
setting a priority of pieces of assist information to be displayed in the display unit in accordance with the acquired lens information; and
displaying the retrieved assist information on a display,
wherein the assist information comprises lens-related assist information which includes at least one of a sample image showing an example corresponding to a lens, a type of a lens used to acquire the sample image, a specification of the lens used to acquire the sample image, and a setting of the lens used to acquire the sample image,
wherein the lens information includes at least one of information indicating whether the corresponding lens is mounted in an imaging apparatus which acquires the image data, information indicating that the corresponding lens has been mounted in the imaging apparatus which acquires the image data, and information indicating whether the user possesses the corresponding lens, and
wherein the lens information further includes information indicative of a time of purchasing the corresponding lens, information indicative of a time of mounting the corresponding lens in the imaging apparatus for a first time, and information indicative of a number of pieces of image data acquired by using the corresponding lens.

* * * * *